United States Patent
Kim et al.

(10) Patent No.: US 12,191,473 B2
(45) Date of Patent: Jan. 7, 2025

(54) ROLLING METHOD FOR ELECTRODE

(71) Applicant: LG Energy Solution, Ltd., Seoul (KR)

(72) Inventors: Il Hong Kim, Daejeon (KR); Sung Chul Lim, Daejeon (KR); Yo Han Kwon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 500 days.

(21) Appl. No.: 17/762,541

(22) PCT Filed: Jul. 30, 2021

(86) PCT No.: PCT/KR2021/009963
§ 371 (c)(1),
(2) Date: Mar. 22, 2022

(87) PCT Pub. No.: WO2022/039407
PCT Pub. Date: Feb. 24, 2022

(65) Prior Publication Data
US 2022/0344630 A1 Oct. 27, 2022

(30) Foreign Application Priority Data
Aug. 21, 2020 (KR) .......... 10-2020-0105341

(51) Int. Cl.
*H01M 4/04* (2006.01)

(52) U.S. Cl.
CPC ....... *H01M 4/0435* (2013.01); *H01M 4/0404* (2013.01); *H01M 4/0471* (2013.01)

(58) Field of Classification Search
CPC .................................................. Y02E 60/10
See application file for complete search history.

(56) References Cited

U.S. PATENT DOCUMENTS

| | | | |
|---|---|---|---|
| 2012/0044295 A1 | 2/2012 | Savarmand et al. | |
| 2015/0125755 A1 | 5/2015 | Ishii | |
| 2015/0243964 A1 | 8/2015 | Yu et al. | |
| 2015/0364749 A1* | 12/2015 | Kim .................... | H01M 4/1391 252/506 |
| 2017/0256781 A1 | 9/2017 | Suzuki et al. | |

(Continued)

FOREIGN PATENT DOCUMENTS

| | | |
|---|---|---|
| CN | 104769754 A | 7/2015 |
| CN | 106804115 A | 6/2017 |

(Continued)

OTHER PUBLICATIONS

Kim et al., WO-2017099358 Machine Translation (Year: 2017).*

(Continued)

*Primary Examiner* — Ula C Ruddock
*Assistant Examiner* — Anna Korovina
(74) *Attorney, Agent, or Firm* — Lerner David LLP

(57) ABSTRACT

A rolling method for an electrode, the method comprising the steps of: coating an electrode slurry including an electrode active material, on a current collector, to form an electrode specimen; measuring rheological properties of the electrode specimen according to temperature; deriving an appropriate temperature condition for rolling the electrode from the rheological properties of the electrode specimen according to temperature; and rolling the electrode in the appropriate temperature condition.

11 Claims, 6 Drawing Sheets

```
Preparing electrode specimen                                    ─ S10

Measuring rheological property of electrode specimen according 
            to temperature                                       ─ S20

Deriving appropriate temperature condition for rolling electrode ─ S30

Rolling electrode at appropriate temperature condition           ─ S40
```

(56) References Cited

U.S. PATENT DOCUMENTS

| | | | |
|---|---|---|---|
| 2018/0175370 A1* | 6/2018 | Kim | .................... H01M 4/1391 |
| 2020/0127274 A1 | 4/2020 | Lee et al. | |
| 2020/0194761 A1 | 6/2020 | Jang et al. | |
| 2020/0259162 A1 | 8/2020 | Lee et al. | |
| 2022/0006161 A1 | 1/2022 | Kim et al. | |

FOREIGN PATENT DOCUMENTS

| | | | |
|---|---|---|---|
| CN | 110100167 A | 8/2019 | |
| CN | 210200863 U | 3/2020 | |
| EP | 3546920 A2 | 10/2019 | |
| JP | 2000067856 A | 3/2000 | |
| JP | 4021652 B2 | 12/2007 | |
| JP | 2010037145 A | 2/2010 | |
| JP | 2014139896 A | 7/2014 | |
| JP | 2016225110 A | 12/2016 | |
| JP | WO2019082587 A1 | 11/2020 | |
| KR | 20150037210 A | 4/2015 | |
| KR | 20170065175 A * | 6/2017 | |
| KR | 101837805 B1 | 3/2018 | |
| KR | 20180023185 A | 3/2018 | |
| KR | 20190001827 A | 1/2019 | |
| KR | 20190036976 A | 4/2019 | |
| KR | 20190051870 A | 5/2019 | |
| KR | 20190052651 A | 5/2019 | |
| KR | 20190062955 A | 6/2019 | |
| KR | 102026527 B1 | 9/2019 | |
| KR | 102070555 B1 | 1/2020 | |
| KR | 20200067575 A | 6/2020 | |
| WO | WO-2017099358 A1 * | 6/2017 | .......... H01M 10/052 |

OTHER PUBLICATIONS

Jo et al., KR-20170065175 Machine Translation (Year: 2017).*
Hawley et al., "Beneficial rheological properties of lithium-ion battery cathode slurries from elevated mixing and coating temperatures", Journal of Energy Storage 26 (2019) 100994 (Year: 2019).*
Extended European Search Report for Application No. 21858494.4 dated Jan. 4, 2023. 9 pgs.
International Search Report for Application No. PCT/KR2021/009963 mailed Nov. 18, 2021, 3 pages.

* cited by examiner

[FIG. 1]
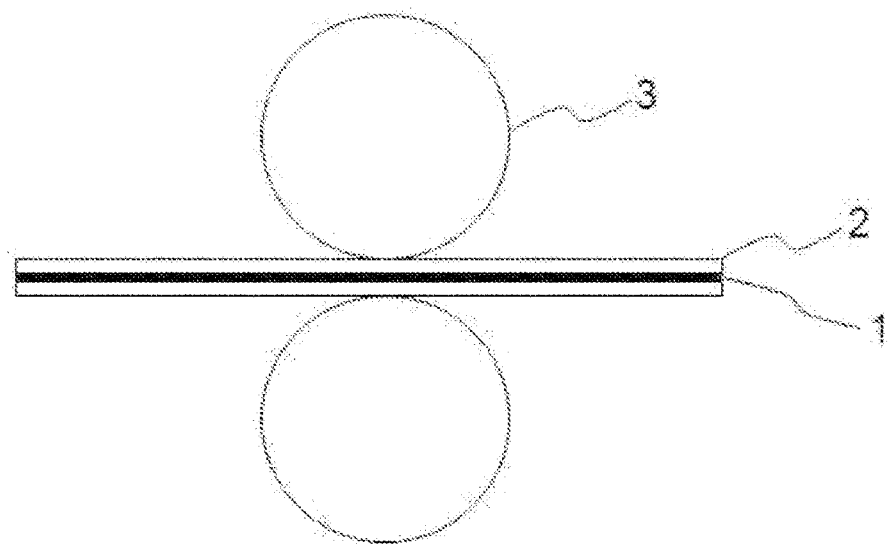
[FIG. 2]
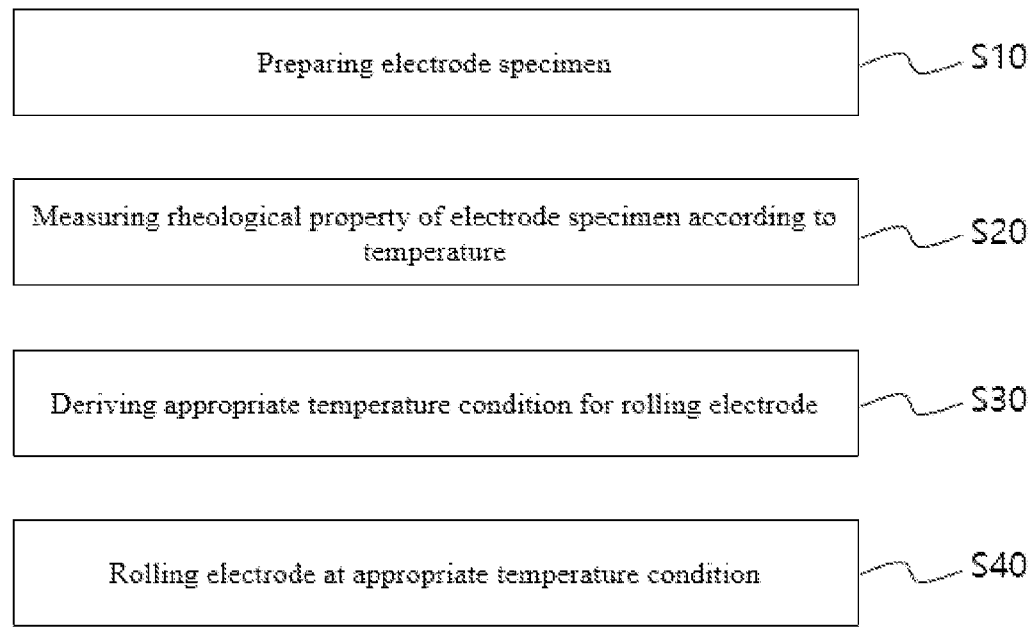

[FIG. 3]
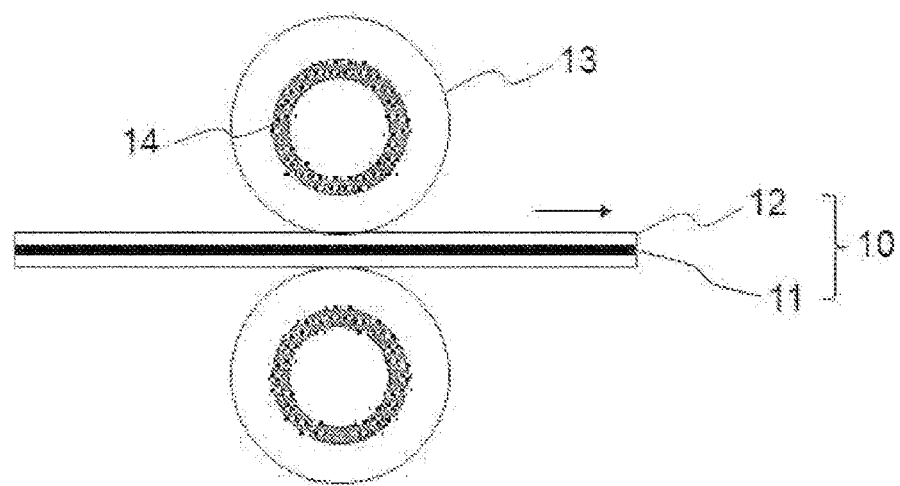
[FIG. 4]
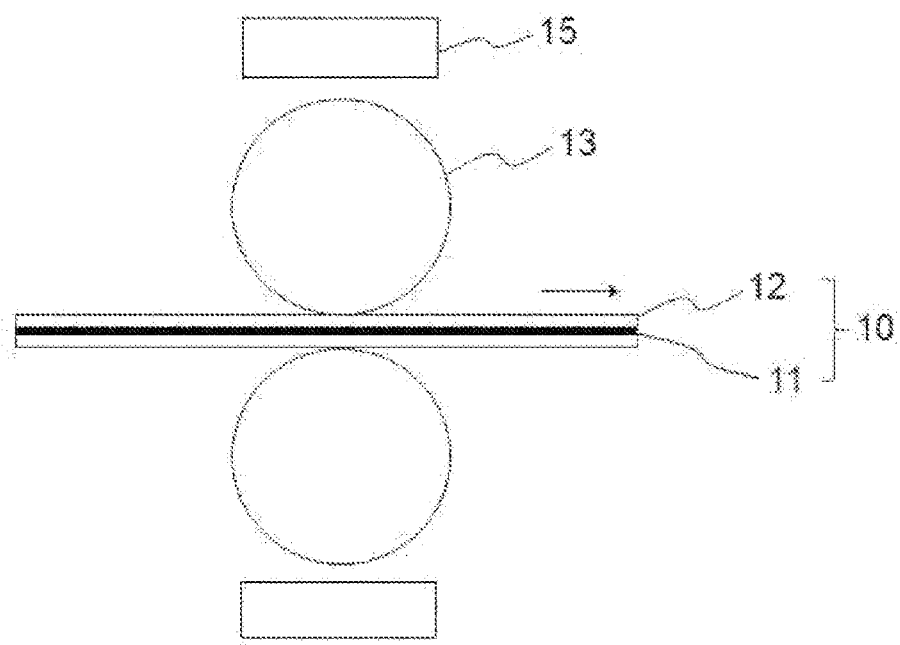

[FIG. 5]
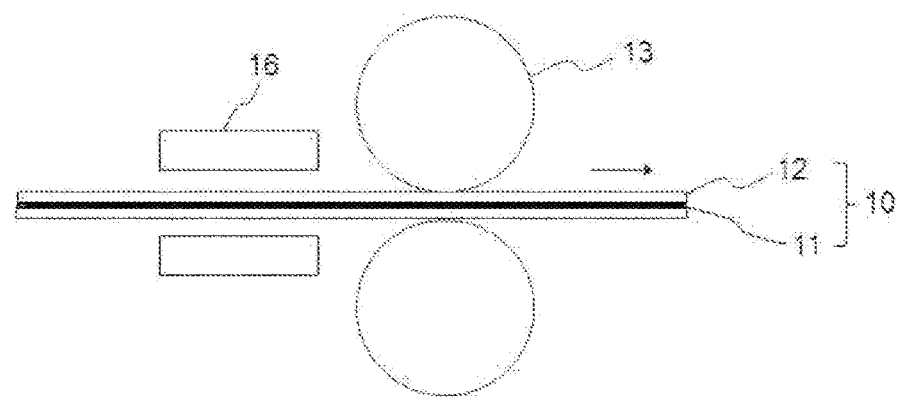
[FIG. 6]
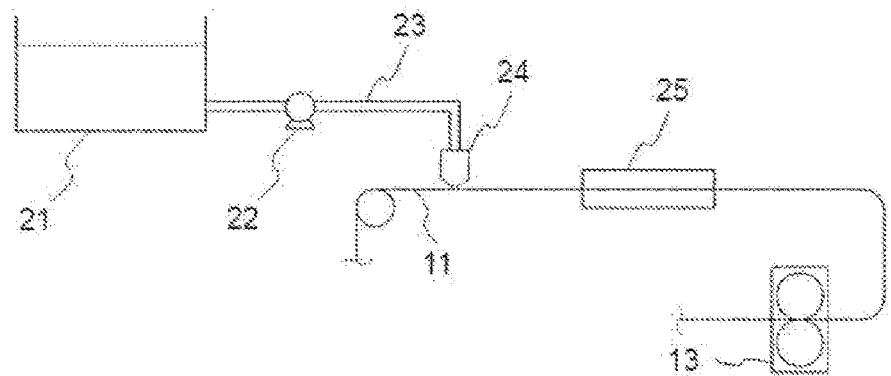

[FIG. 7]
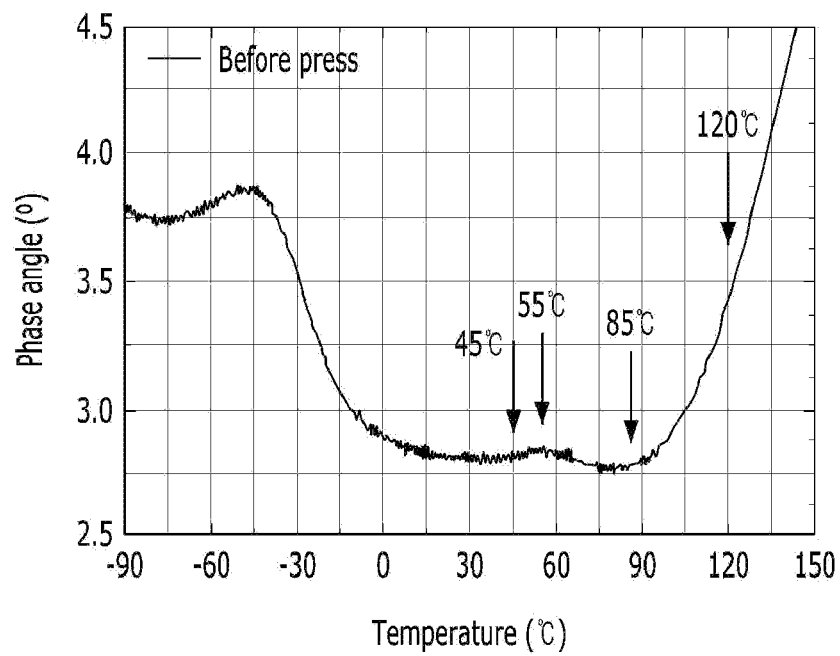
[FIG. 8]
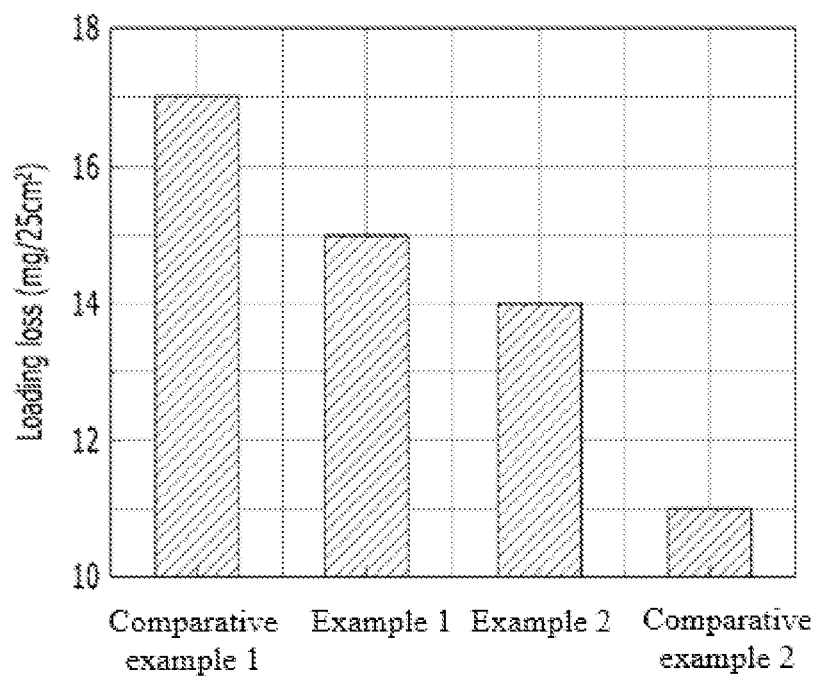

[FIG. 9]
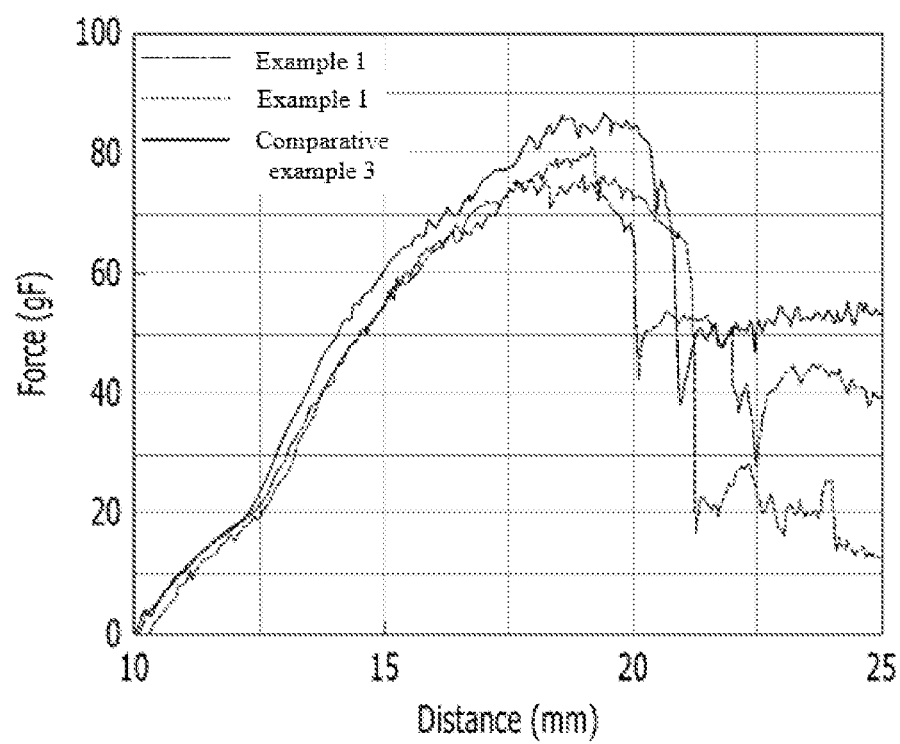

[FIG. 10]
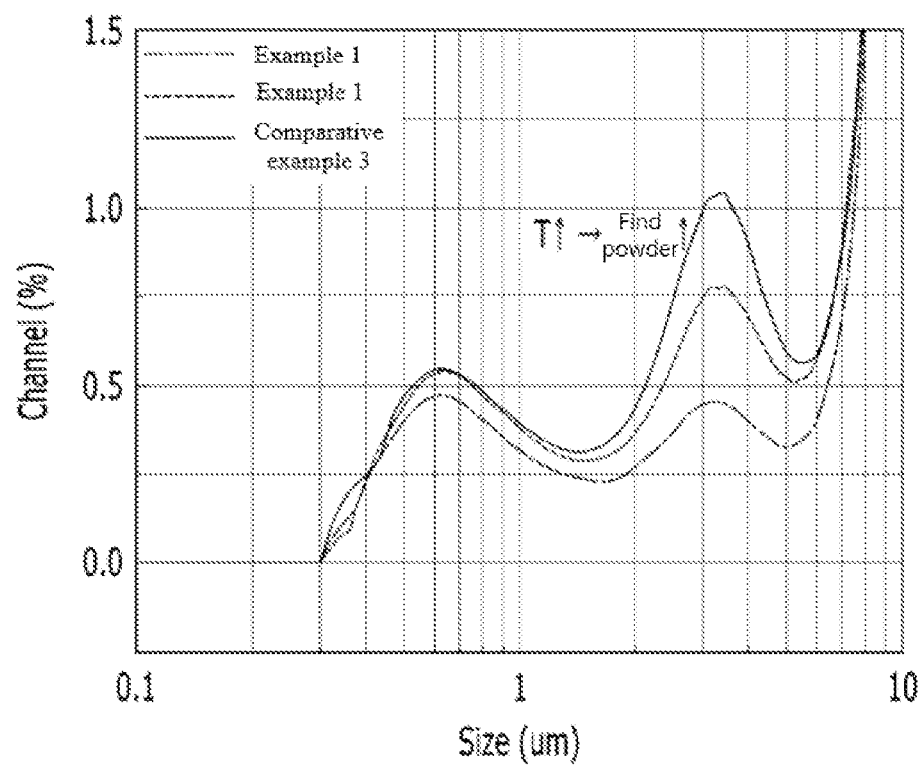

ROLLING METHOD FOR ELECTRODE

CROSS-REFERENCE TO RELATED APPLICATIONS

This application is a national phase entry under 35 U.S.C. § 371 of International Application No. PCT/KR2021/009963, filed on Jul. 30, 2021, which claims priority from Korean Patent Application No. 10-2020-0105341, filed on Aug. 21, 2020, the disclosures of which are incorporated herein by reference.

TECHNICAL FIELD

The present invention relates to a method of rolling an electrode, and more particularly, to an electrode rolling method capable of measuring the rheological property according to the temperature of an electrode, and rolling the electrode under an appropriate temperature condition obtained from the change in the rheological property change.

BACKGROUND ART

Recently, secondary batteries capable of charging and discharging have been widely used as energy sources of wireless mobile devices. In addition, the secondary battery has attracted attention as an energy source of an electric vehicle, a hybrid electric vehicle, etc., which are proposed as a solution for air pollution of existing gasoline vehicles and diesel vehicles using fossil fuel. Therefore, the types of applications using the secondary battery are currently much diversified due to the advantages of the secondary battery, and it is expected that the secondary battery will be applied to many fields and products in the future.

Such secondary batteries may be classified into lithium ion batteries, lithium ion polymer batteries, lithium polymer batteries, etc., depending on the composition of the electrode and the electrolyte, and among them, the amount of use of lithium-ion polymer batteries that are less likely to leak electrolyte and are easy to manufacture is on the increase. In general, secondary batteries are classified into cylindrical batteries and prismatic batteries in which an electrode assembly is embedded in a cylindrical or rectangular metal can, depending on the shape of a battery case, and pouch-type batteries in which the electrode assembly is embedded in a pouch-type case of an aluminum laminate sheet. The electrode assembly built into the battery case is composed of a positive electrode, a negative electrode, and a separator interposed between the positive electrode and the negative electrode, and is a power generating element capable of charging and discharging. The electrode assembly is classified into a jelly-roll type wound with a separator interposed between the positive electrode and the negative electrode which are long sheet-shaped and are coated with active materials, and a stack type in which a plurality of positive electrodes and negative electrodes of a predetermined size are sequentially stacked while a separator is interposed therebetween.

The positive electrode and the negative electrode are formed by applying a positive electrode slurry containing a positive electrode active material and a negative electrode slurry containing a negative electrode active material to a positive electrode current collector and a negative electrode current collector, to thereby form a positive electrode active material layer and a negative electrode active material layer, respectively, followed by drying and rolling them.

FIG. 1 is a schematic diagram showing a general rolling process of an electrode.

Referring to FIG. 1, generally, in the rolling process, a current collector 1, where an electrode active material layer is formed by application of an electrode slurry, pass through a space between a pair of rollers 3. However, as a thick electrode slurry is applied on the current collector to increase the energy density of a battery, the rolling may be insufficiently performed. In this case, as the electrode is cut or the electrode slurry is detached by the stretching of the current collector during the process, the coated amount of the electrode active material may decrease. In the case that the electrode is cut during the process, the process efficiency is reduced, resulting in losses, and the coated amount of the electrode active material decreases after rolling, the desired battery capacity cannot be obtained.

Therefore, it is necessary to set the appropriate rolling conditions to increase the rolling efficiency.

PRIOR ART LITERATURE

Patent Document (Patent Document 1) Japanese Patent Publication No. 2000-067856

DISCLOSURE

Technical Problem

The present invention is believed to solve at least some of the above problems. For example, an aspect of the present invention provides an electrode rolling method capable of improving a rolling performance and obtaining a desired battery capacity by improving a phenomenon that the electrode is cut during the rolling process and a phenomenon that the coated amount of the electrode active material decreases after rolling.

Technical Solution

In one embodiment of the present invention, a method for rolling an electrode includes: preparing an electrode specimen by applying an electrode slurry containing an electrode active material on a current collector; measuring a rheological property of the electrode specimen according to a temperature; deriving an appropriate temperature condition for rolling an electrode from the rheological property of the electrode specimen according to the temperature; and manufacturing an electrode and rolling the electrode under the appropriate temperature condition.

At this time, the appropriate temperature condition corresponds to a temperature range between a beta transition temperature and an alpha transition temperature. The beta transition temperature is observed between the gamma transition temperature ($T_g$) and the alpha transition temperature ($T_{cr}$), and the temperature range between the beta transition temperature and the alpha transition temperature is the appropriate temperature range for rolling an electrode of the present technology.

In a specific example, the rheological property is a phase angle.

At this time, the phase angle (δ) is expressed as a following formula 1:

$$\delta = \tan^{-1}(G''/G'), \qquad \text{[Formula 1]}$$

wherein G' denotes a storage modulus, and G" denotes a loss modulus, and wherein the G' and the G" are measured by a rheometer which vibrates in a range of 0.1 to 10 Hz.

In a specific example, the deriving of the appropriate temperature condition includes building a database about information on the rheological property of the electrode specimen according to the temperature.

At this time, the appropriate temperature condition is derived from the database.

Further, the appropriate temperature condition for rolling the electrode is derived from a temperature condition at a specific point where a tendency of a rheological property change is changed according to a temperature in the database.

In one example, the rolling of the electrode under the appropriate temperature condition includes rolling the electrode using a roller which has been heated under an appropriate temperature condition.

In one example, the rolling of the electrode under the appropriate temperature condition includes heating the electrode before being rolled, under an appropriate temperature condition.

Further, the present disclosure provides a method for manufacturing an electrode including the above-described method for rolling the electrode.

Further, the present disclosure provides a method for manufacturing a secondary battery including the above-described method for manufacturing the electrode.

Advantageous Effects

According to the method of rolling an electrode according to the present disclosure, it is possible to measure the rheological property of the electrode according to the temperature and derive an appropriate temperature condition for rolling the electrode therefrom. Further, since the electrode is rolled according to the appropriate temperature condition while heating the electrode, it is possible to more easily roll the electrode and manufacture an electrode by sufficiently rolling an electrode slurry applied on the current collector.

As such, the desired battery capacity can be obtained by preventing the reduction of the coated amount of the electrode slurry by preventing a phenomenon that an electrode is cut during the electrode manufacturing process, or a phenomenon that an electrode slurry is detached from the current collector by the stretching of the current collector during the rolling process.

BRIEF DESCRIPTION OF THE DRAWINGS

FIG. 1 is a schematic diagram showing a general rolling process of an electrode.

FIG. 2 is a flowchart illustrating the order of the rolling process of an electrode according to the present technology.

FIGS. 3 and 4 are schematic diagrams showing a process of rolling an electrode in a rolling method of an electrode according to an embodiment of the present disclosure.

FIG. 5 is a schematic diagram showing a process of rolling an electrode in a rolling method of an electrode according to another embodiment of the present disclosure.

FIG. 6 is a schematic diagram illustrating a process according to an electrode manufacturing method according to the present disclosure.

FIG. 7 is a graph showing a change in the rheological property according to the temperature of an electrode specimen prepared according to a preparation example.

FIG. 8 is a graph showing the reduction of a coating amount after rolling in Examples and Comparative Examples of the present disclosure.

FIG. 9 is a graph showing the brittleness of an electrode in Examples and Comparative Examples of the present disclosure.

FIG. 10 is a graph showing the amount of powder generated after rolling an electrode in Examples and Comparative Examples of the present disclosure.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

Hereinafter, the present invention will be described in detail with reference to the drawings.

FIG. 2 is a flowchart illustrating the order of the rolling process of an electrode according to the present technology.

Referring to FIG. 2, in another embodiment of the present disclosure, a method for rolling an electrode includes: preparing an electrode specimen by applying an electrode slurry containing an electrode active material on a current collector (S10); measuring a rheological property of the electrode specimen according to a temperature (S20); deriving an appropriate temperature condition for rolling an electrode from the rheological property of the electrode specimen according to the temperature (S30); and manufacturing an electrode and rolling the electrode under the appropriate temperature condition (S40).

As described above, in the conventional electrode rolling process, as the current collector, on which the electrode slurry has been applied, is directly rolled without the optimization process of rolling conditions, the rolling may not be sufficiently performed. In this case, as the electrode is cut or the electrode slurry is detached by the stretching of the current collector during the process, the coated amount of the electrode active material may decrease. In the case that the electrode is cut during the process, the process efficiency is reduced, resulting in losses, and the coated amount of the electrode active material decreases after rolling, the desired battery capacity cannot be obtained.

As such, according to the method of rolling an electrode of the present disclosure, rheological properties of an electrode according to the temperature are measured, an appropriate temperature condition for the rolling of the electrode is derived the rheological properties, and the electrode is then rolled while heating the electrode according to the appropriate temperature condition. As such, the rolling can be more easily performed, and the electrode can be manufactured after sufficiently rolling the electrode slurry applied on the current collector.

As such, the desired battery capacity can be obtained by preventing the reduction of the coated amount of the electrode slurry by preventing a phenomenon that an electrode is cut during the electrode manufacturing process, or a phenomenon that an electrode slurry is detached from the current collector by the stretching of the current collector during the rolling process.

<Preparation of Electrode Specimen>

In the present technology, the electrode specimen is prepared by forming an electrode active material layer by applying an electrode slurry containing an electrode active material on a current collector.

The current collector may be a positive electrode current collector or a negative electrode current collector, and the electrode active material may be a positive electrode active material or a negative electrode active material. In addition, the electrode slurry may further include a conductive material and a binder in addition to the electrode active material.

In the present disclosure, "electrode specimen" refers to a subject of experiment made for the experiment in the step of deriving an appropriate temperature condition for electrode rolling. Further, "electrode" refers to a product manufactured to actually apply the appropriate temperature condition derived from the above.

In the present disclosure, the positive electrode collector generally has a thickness of 3 to 500 micrometers. The positive electrode current collector is not particularly limited as long as it has high conductivity without causing a chemical change in the battery. Examples of the positive electrode current collector include stainless steel, aluminum, nickel, titanium, sintered carbon or aluminum or stainless steel of which the surface has been treated with carbon, nickel, titanium, silver, or the like. The current collector may have fine irregularities on the surface thereof to increase the adhesion of the positive electrode active material, and various forms such as a film, a sheet, a foil, a net, a porous body, a foam, and a nonwoven fabric are possible.

The sheet for the negative electrode collector generally has a thickness of 3 to 500 micrometers. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a film, a sheet, a foil, a net, a porous body, a foam, and a nonwoven fabric.

In the present technology, the positive electrode active material is a material capable of causing an electrochemical reaction and a lithium transition metal oxide, and contains two or more transition metals. Examples thereof include: layered compounds such as lithium cobalt oxide ($LiCoO_2$) and lithium nickel oxide ($LiNiO_2$) substituted with one or more transition metals; lithium manganese oxide substituted with one or more transition metals; lithium nickel oxide represented by the formula $LiNi_{1-y}M_yO_2$ (wherein M=Co, Mn, Al, Cu, Fe, Mg, B, Cr, Zn or Ga and contains at least one of the above elements, $0.01 \leq y \leq 0.7$); lithium nickel cobalt manganese composite oxide represented by the formula $Li_{1+z}Ni_bMn_cCo_{1-(b+c+d)}M_dO_{(2-e)}A_e$ such as $Li_{1+z}Ni_{1/3}Co_{1/3}Mn_{1/3}O_2$, $Li_{1+z}Ni_{0.4}Mn_{0.4}Co_{0.2}O_2$ etc. (wherein $-0.5 \leq z \leq 0.5$, $0.1 \leq b \leq 0.8$, $0.1 \leq c \leq 0.8$, $0 \leq d \leq 0.2$, $0 \leq e \leq 0.2$, b+c+d<1, M=Al, Mg, Cr, Ti, Si or Y, and A=F, P or Cl); olivine-based lithium metal phosphate represented by the formula $Li_{1+x}M_{1-y}M'_yPO_{4-z}X_z$ (wherein M=transition metal, preferably Fe, Mn, Co or Ni, M'=Al, Mg or Ti, X=F, S or N, and $-0.5 \leq x \leq 0.5$, $0 \leq y \leq 0.5$, $0 \leq z \leq 0.1$).

Examples of the negative electrode active material include carbon such as non-graphitized carbon and graphite carbon; metal complex oxide such as $Li_xFe_2O_3$ ($0 \leq x \leq 1$), $Li_xWO2$ ($0 \leq x \leq 1$), $Sn_xMe_{1-x}Me'_yO_z$ (Me: Mn, Fe, Pb, Ge; Me': Al, B, P, Si, groups 1, 2, and 3 of the periodic table, halogen; $0 < x \leq 1$; $1 \leq y \leq 3$; $1 \leq z \leq 8$); lithium alloy; silicon alloy; tin alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The conductive material is usually added in an amount of 1 to 30% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like. The binder is added in an amount of 1 to 30% by weight, on the basis of the total weight of the mixture containing the positive electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

<Rheological Property of Electrode Specimen>

When the electrode specimen is prepared, the rheological property is measured for the electrode specimen. The rheological property is a property that is shown when a material flown or deformed. The rheological property is a parameter related to viscoelasticity (a phenomenon that the nature of both a solid and a liquid is shown at the same time when force is applied to an object), and includes a viscosity, a modulus of elasticity, stress and a shear speed, etc. All objects have such a viscoelasticity. The closer an object is to a liquid, the less resilient to force that causes deformation as viscous materials, and the closer this object is to a solid, the stronger the restoring force is against this force, thereby causing elastic deformation. Such a rheological property may imply a behavior of an electrode active material when an electrode active material is flown or modified through external force in the manufacturing process of a battery, such as a notching, slitting, or laminating process.

In one example, the rheological property is a phase angle of an electrode. The phase angle is generated from the difference between the stress applied to an object and the deformation. The phase angle means the angle of the loss tangent (tan δ) calculated by the ratio of the storage modulus and the loss modulus and may be calculated by the following formula 1.

$$\delta = \tan^{-1}(G''/G'),  \quad [\text{Formula 1}]$$

In the formula 1, G' denotes the storage modulus, and G" denotes the loss modulus.

In the above formula 1, the storage modulus (G') is an index indicating the elasticity of the measurement object, and the loss modulus (G") is an index indicating the viscosity of the measurement object. That is, the storage modulus and the loss modulus can be viewed as an index indicating the elasticity and viscosity of the electrode, and particularly the elasticity and viscosity of the electrode active material portion. The storage modulus G' can be calculated from the stress response measured at the maximum displacement. However, the loss modulus G" can be calculated from the stress response measured at the zero displacement or can be calculated by obtaining the storage modulus G' and the loss modulus G" using modified Fourier calculation and obtaining the stress response of a plurality samples while each cycle is continued. Further, the G' and the G" are measured in the frequency in the range of 0.1 to 10 Hz after loading the electrode specimen in a rheometer. At this time, the rheometer may refer to a solid rheometer or a dynamic mechanical analysis (DMA).

In the present technology, when the phase angle of the electrode is large, it means that the viscosity is predominant in the attribute of the electrode, and accordingly the electrode has a liquid-like property and may be easily deformed by the external pressure. Namely, it means that when the electrode is rolled, the shape of the electrode slurry can be easily changed by the pressure applied by the roller. On the other hand, when the phase angle of the electrode is small, it means that the elasticity is predominant in the attribute of the electrode, and accordingly the electrode has a solid-like property and is not easily deformed by the external pressure. Namely, it means that when the electrode is rolled, the shape of the electrode slurry is not easily changed by the pressure applied by the roller.

Further, in the method of rolling an electrode according to the present technology, the rheological property is measured in relation to temperature. Herein, the phase angle according to the temperature can be measured while raising the temperature of the electrode specimen at a constant rate.

Further, it is possible to prepare an electrode specimen by changing the composition of the electrode slurry and measure the rheological property according to the temperature.

<Deriving Appropriate Temperature Condition>

Likewise, if the rheological property of the electrode specimen according to the temperature is measured, the temperature condition for rolling the electrode specimen is derived therefrom.

To this end, the deriving of the appropriate temperature condition includes building a database about information on the rheological property of the electrode specimen according to the temperature. This is to recognize the trend of the change in the rheological property value of the electrode specimen according to the temperature. To this end, after manufacturing a plurality of electrode specimens, the rheological property according to each temperature is measured, and the measured information may be saved in a storage system such as a memory. Further, such a database may be recorded in visual data such as tables or graphs. At this time, it is desirable to measure the rheological property for the maximum number of electrode specimens for the accuracy of the measurement.

When the database is completed, appropriate temperature conditions for the rolling of the electrode are derived therefrom.

At this time, the appropriate temperature condition for rolling the electrode may be derived from a temperature condition at a specific point where a tendency of a rheological property change is changed according to a temperature in the database. Specifically, in the rheological property change graph of the electrode according to temperature, the portion, where an inflection point or a peak has been formed, may be determined as a point where a tendency of a rheological property change is changed. The rolling of the electrode can be determined to be performed in the temperature range between the specific points.

Specifically, when measuring the rheological property of the electrode according to the temperature, for example, the phase angle of the electrode according to the temperature, the inflection point or the peak appears in three places. The position of the inflection point or peak may vary depending on the components of the electrode such as an active material or a binder. For example, referring to FIG. 7, the peak may be shown at −45° C., 55° C. and 85° C. At this time, the temperature, at which the peak is shown, means the gamma transition temperature ($T_g$), the beta transition temperature, and the alpha transition temperature ($T_{cr}$), respectively, from the lowest temperature in order. The beta transition temperature is observed between the gamma transition temperature and the alpha transition temperature.

At this time, the appropriate temperature condition for rolling the electrode may be set to the temperature range between the beta transition temperature and the alpha transition temperature. The effect of the present technology can be achieved within the temperature range. When the temperature for the electrode rolling is less than the beta transition temperature, it means that the temperature is low, and the rheological property of the electrode is close to a solid. In this case, when pressure is applied by a roller, the electrode current collector may be broken, or the electrode active material layer may be detached from the current collector, thereby reducing the coated amount after rolling. As such, the intended effects cannot be obtained. Namely, when the electrode is rolled under a temperature condition of a beta transition temperature or higher, the nature of the electrode active material layer applied on the current collector becomes close to a liquid. As such, the shape of the electrode active material layer is changed by the rolling of the electrode, but the electrode active material layer is not broken or is not detached from the current collector by the pressure.

On the other hand, when the temperature for electrode rolling exceeds the alpha transition temperature, the temperature becomes too high, thereby increasing the brittle of the electrode, and the amount of the fine powder in the electrode increases, which is not desirable.

<Rolling of Electrode>

When the appropriate temperature condition is determined, the electrode is rolled under the appropriate temperature condition.

To this end, an electrode is prepared by applying an electrode slurry containing an electrode active material on the current collector. The current collector and the electrode slurry may be the same as those used in the electrode specimen.

In one example, the rolling of the electrode under the appropriate temperature condition includes rolling the electrode using a roller which has been heated under an appropriate temperature condition derived from the above-described method. In this case, the roller is heated at an appropriate temperature condition during the rolling process of the electrode, and the appropriate temperature condition is maintained during rolling. To this end, the rolling roller may further include a heater or a heating member.

In another example, the rolling of the electrode under the appropriate temperature condition includes heating the electrode before being rolled, under an appropriate temperature condition. In this case, the electrode maintains the appropriate temperature condition during rolling in the state that has been heated before rolling, and for this purpose, a heater can be used to pre-heat the electrode before rolling. At this time, the heater may have a chamber shape that surrounds the electrode, or may have a structure capable of applying a hot air or infrared ray at a constant interval of the electrode.

Further, in the present technology, both of the above two methods may be used for the step of rolling an electrode under the appropriate temperature condition.

FIGS. 3 and 4 are schematic diagrams showing a process of rolling an electrode in a rolling method of an electrode according to an embodiment of the present disclosure.

Referring to FIG. 3, the electrode 10 has a structure where an electrode active material layer 12 is formed as an electrode slurry is applied on both surfaces of the current collector 11, and a roller 13 rolls the electrode 10. At this time, the roller 13 maintains an appropriate temperature condition. At this time, maintaining the appropriate temperature condition by the roller 13 means maintaining the surface of the roller 13 at an appropriate temperature condition. To this end, it is possible to insert a heating member 14 capable of generating heat at the inside of the roller 13. There is no particular limitation on the heating method of the heating member 14 as long as the roller 13 can be heated inside. For example, it may be a form in which a flow path where a heated fluid flows is formed, or an electric heating method such as induction heating can be used. In addition, it is preferable that the roller 13 is made of a metal material such as aluminum and iron so that the internal heat can be transmitted to the surface.

Further, referring to FIG. 4, as in FIG. 3, the electrode 10 has a structure where the electrode active material layer 12 is formed as an electrode slurry is applied on both surfaces of the current collector 11, and the roller 13 rolls the electrode 10. At this time, the roller 13 should maintain an appropriate temperature condition. To this end, a heater 15 capable of directly applying heat to the surface of the roller 13 may be installed. There is no particular limitation on the kind of the heater 15 as long as it can heat the surface of the rolling roller 13. For example, an infrared heater or a heater of spraying a hot air may be used as the heater 15. Further, an electric heater which uses induction heating, etc. may also be used. In addition, it is preferable that the roller 13 is made of a metal material such as aluminum and iron so that the internal heat can be transmitted to the surface. In addition, a plurality of heaters 15 may be disposed along the outer peripheral surface of the roller 13, and there is no particular limitation in the number and arrangement form of the heaters 15.

FIG. 5 is a schematic diagram showing a process of rolling an electrode in a rolling method of an electrode according to another embodiment of the present disclosure.

Referring to FIG. 5, the electrode 10 has a structure where an electrode active material layer 12 is formed as an electrode slurry is applied on both surfaces of the current collector 11, and a roller 13 rolls the electrode 10. At this time, the heater 16 located at the upstream point of the roller can heat the electrode 10 to the appropriate temperature condition before the roller 13 rolls the electrode 10. There is no particular limitation on the kind of the heater 16 as long as it can heat the electrode 10. For example, an infrared heater or a heater of spraying a hot air may be used as the heater 15. Specifically, FIG. 5 illustrates a heater 16 which applies infrared rays or hot air from a position spaced apart from the electrode. A chamber-shaped heater surrounding the electrode is also possible.

Further, as described above, the electrode may be heated through a constant-temperature chamber capable of receiving both the electrode and the roller.

Further, the present disclosure provides a method for manufacturing an electrode including the above-described method for rolling the electrode.

FIG. 6 is a schematic diagram illustrating a process according to an electrode manufacturing method according to the present technology.

Referring to FIG. 6, the method of manufacturing an electrode according to the present technology includes a process of preparing an electrode active material, preparing an electrode slurry by mixing the electrode active material with a conductive material, a binder, etc., and then forming an electrode active material layer by applying the electrode slurry on the current collector 11. Specifically, the electrode slurry is prepared as the electrode active material is mixed with the binder, the conductive material, and a solvent and is then stirred in a mixer (not shown). The dispersion of the electrode slurry is enhanced by being filtered through a sieve or a filter, and is then transferred from a tank 21 to a coating die 24 through a slurry supply nozzle 23 using a supply pump as a medium and is applied.

The electrode slurry, which is applied on the current collector 11, is sequentially moved along a transfer conveyor (not shown), and in this process, the electrode slurry is dried by a drying device 25 and is then rolled by a pair of rollers 13. At this time, the rolling process may be performed in a temperature condition derived by the method as described above. Thus, the rolled current collector may be cut to a suitable length to thereby prepare unit electrodes.

Further, the present technology provides a method for manufacturing a secondary battery including the above-described method for manufacturing the electrode.

The secondary battery is manufactured as an electrode assembly having a structure, in which a positive electrode, a separator and a negative electrode are alternately stacked, is accommodated in a battery case. At this time, the positive electrode and negative electrode may be prepared by the electrode manufacturing method as described above. The separator insulates the positive electrode and the negative electrode and maintains the electrolyte solution to provide a passage for ion conduction, and a thin porous film composed of olefin-based polymers such as polypropylene can be used as the separator. details about the separator are known to those of ordinary skill in the art, and thus the detailed description thereof is omitted here.

Further, the battery case is not particularly limited as long as it is used as an exterior material for packaging the battery, and a cylindrical, square, or pouch type may be used and specifically a pouch-type battery case may be used. Likewise, details about the battery case are known to those of ordinary skill in the art, and thus the detailed description thereof is omitted here.

Further, a positive electrode tab and a negative electrode tab may be formed at the positive electrode and the negative electrode, respectively, and a positive electrode lead and a negative electrode lead are connected to the positive electrode tab and the negative electrode tab, respectively. The positive electrode lead and the negative electrode lead are drawn to the outside to thereby play a role of a terminal which is electrically connected to the outside.

When an electrode assembly is accommodated in a battery case, an electrolyte solution is injected and the battery case is sealed, and then a formation process is performed, to thereby manufacture a secondary battery.

DETAILED DESCRIPTION OF THE PREFERRED EMBODIMENTS

Hereinafter, the present invention will be described in detail with reference to examples. However, the embodiments according to the present invention may be modified into various other forms, and the scope of the present invention should not be construed as being limited to the examples described below. The examples of the present invention are provided to more fully describe the present invention to those skilled in the art.

EXAMPLE

Preparation of Electrode Specimen 96 parts by weight of lithium nickel-cobalt-manganese oxide as a positive electrode active material, 2 parts by weight of PVDF as a binder, and 2 parts by weight of carbon black as a conductive material were mixed to thereby prepare a positive electrode mixture. The positive electrode slurry was prepared by dispersing the positive electrode mixture in NMP functioning as a solvent. A positive electrode active material layer was prepared by coating, drying, and pressing the slurry on both sides of an aluminum foil having a thickness of 12 μm. This was cut to have a width of 10 mm, and a length of 70 mm to thereby prepare an electrode specimen.

Measuring Rheological Property According to Temperature and Deriving Rolling Temperature The phase angle as the rheological property was measured for the electrode specimen.

At this time, the phase angle of the electrode specimen was measured while applying strain of 0.1% at the heating rate of 5° C./min in the temperature range of sub-zero 90° C. to 150° C. by using a rheometer. At this time, the phase angle was measured at room temperature. TA company Q800 was used as the rheometer, and the phase angle was measured under the condition of the frequency 1 Hz. The result is shown in FIG. 7.

Next, an appropriate temperature condition for rolling the electrode was derived.

Specifically, the temperature at a point where the trend of the change in the phase angle in the temperature of a room temperature or higher is changed, that is, a point where an inflection point is formed in a graph according to FIG. 7, is determined as the minimum temperature for the electrode rolling. In FIG. 7, the appropriate temperature condition was determined as the temperature range of 55° C. (beta transition temperature), which shows the peak, to 85° C. (alpha transition temperature).

Example 1

In the same manner as the above-described method, a positive electrode slurry was applied to both surfaces of aluminum foil as a positive electrode current collector to prepare an electrode. The electrode was dried and rolled at a temperature of 60° C. Specifically, the surface of the rolling roll was heated to 60° C. by the same method as in FIG. 3. At this time, the electrode was rolled so that the thickness of the electrode active material layer became 182 μm.

Example 2

The electrode was prepared in the same manner as in Example 1, except that the electrode was rolled at a temperature of 80° C.

Comparative Example 1

The electrode was prepared in the same manner as in Example 1, except that the electrode was rolled at a temperature of 25° C.

Comparative Example 2

The electrode was prepared in the same manner as in Example 1, except that the electrode was rolled at a temperature of 45° C.

Comparative Example 3

The electrode was prepared in the same manner as in Example 1, except that the electrode was rolled at a temperature of 120° C.

Experimental Example 1

The thickness of the electrode was measured with respect to the electrode manufactured in Examples and Comparative Examples. The result is shown in Table 1. At this time, when reaching the targeted thickness of the electrode, it is indicated by "Pass", and when failing to reach the targeted thickness of the electrode or a phenomenon such as disconnection occurs in the electrode active material layer, it is indicated by "Fail".

Experimental Example 2

For electrodes prepared in the examples and comparative examples, the reduction (loading loss) in the coated amount before and after rolling was measured. Specifically, the coated amount refers to the weight of the electrode active material layer coated per unit area of the electrode. Namely, the reduction of the coated amount before and after rolling means the difference between the coated amount before rolling and the coated amount after rolling. The result was shown in FIG. 8.

Experimental Example 3

The brittleness of the electrode was measured for the electrodes prepared in Examples 1 and 2, and Comparative Example 3. Specifically, after disposing an electrode on a brittleness evaluation device, one point of the electrode was pressed, and force applied to the electrode according to the displacement of the electrode was measured. Thereafter, the difference in the force value before and after the plastic deformation of the electrode was determined as brittleness. The result is shown in FIG. 9. Any commercially available brittleness evaluation device may be used to evaluate the brittleness.

Experimental Example 4

For the electrodes prepared in the examples 1 and 2 and the comparative example 3, the amounts of generation of fine powder of the electrodes after rolling were measured. Specifically, the amount of generation of fine powder of the electrode was determined by measuring the particle size distribution of the active materials applied on the electrode, and the content of the active materials having a particle size equal to or less than a specific size was measured. In addition, the particle size distribution was measured using a particle size analyzer (e.g., Horiba, La-960). The result is shown in FIG. 10.

TABLE 1

| Division | Rolling temperature (° C.) | Result | Electrode thickness (μm) |
|---|---|---|---|
| Example 1 | 60 | Pass | 182 |
| Example 2 | 80 | Pass | 182 |
| Example 3 | 120 | Pass | 183 |
| Comparative Example 1 | 25 | Fail | — |
| Comparative Example 2 | 45 | Fail | — |

Referring to FIG. Table 1, in the case of the examples 1 and 2 where the rolling was performed in a temperature higher than the temperature of the appropriate temperature condition derived according to the present technology, disconnection of the electrode or the damage to the applied electrode active material layer did not occur during the rolling process, and a desired thickness could be obtained. On the other hand, in the case of comparative examples 1 and 2, targeted effects could not be achieved as the rolling was performed in a temperature lower than an appropriate temperature condition.

Further, referring to FIG. 8, in the case of examples 1 and 2 where the rolling was performed in a temperature higher than the temperature in the appropriate temperature condition derived according to the present technology, the reduction in the coated amount was smaller than that in the comparative example 1 where the rolling was performed in a temperature lower than the temperature of the appropriate temperature condition.

However, referring to FIGS. 8 to 10, in the case of the comparative example 3 where the rolling was performed in a temperature higher than the appropriate temperature condition, the reduction in the coated amount was small, but the brittleness of the electrode increased, compared to examples 1 and 2. Further, in the case of the comparative example 3, the amount of generation of fine powder having a particle size of 1 to 10 μm was large, compared to the examples 1 and 2.

The above description is merely illustrative of the technical idea of the present invention, and those skilled in the art to which the present invention pertains may make various modifications and variations without departing from the essential characteristics of the present invention. Therefore, the drawings disclosed in the present invention are not intended to limit the technical idea of the present invention but to describe the present invention, and the scope of the technical idea of the present invention is not limited by these drawings. The scope of protection of the present invention should be interpreted by the following claims, and all technical ideas within the scope equivalent thereto should be construed as being included in the scope of the present invention.

DESCRIPTION OF REFERENCE NUMERALS

1, 11: current collector
2, 12: electrode active material layer
3, 13: roller
10: electrode
14: heating member
15, 16: heater
21: tank
22: supply pump
23: slurry supply nozzle
24: coating die
25: drying device

The invention claimed is:

1. A method for rolling an electrode, the method comprising:
preparing an electrode specimen by applying an electrode slurry containing an electrode active material on a current collector;
measuring a rheological property of the electrode specimen according to a temperature;
deriving an appropriate temperature condition for rolling an electrode from the rheological property of the electrode specimen according to the temperature; and
manufacturing the electrode and rolling the electrode under the appropriate temperature condition.

2. The method of claim 1, wherein the appropriate temperature condition corresponds to a temperature range between a beta transition temperature and an alpha transition temperature (Tcr).

3. The method of claim 1, wherein the rheological property is a phase angle.

4. The method of claim 3, wherein the phase angle (δ) is expressed as a following formula 1:

$$\delta = \tan^{-1}(G''/G'), \qquad \text{[Formula 1]}$$

wherein G' denotes a storage modulus, and G" denotes a loss modulus, and wherein the G' and the G" are measured by a rheometer which vibrates in a range of 0.1 to 10 Hz.

5. The method of claim 1, wherein the deriving of the appropriate temperature condition includes building a database of information on the rheological property of the electrode specimen according to the temperature.

6. The method of claim 5, wherein the appropriate temperature condition is derived from the database.

7. The method of claim 6, wherein the appropriate temperature condition for rolling the electrode is derived from a temperature condition at a specific point where a tendency of a rheological property change is changed according to a temperature in the database.

8. The method of claim 1, wherein the rolling of the electrode under the appropriate temperature condition includes rolling the electrode using a roller which has been heated under the appropriate temperature condition.

9. The method of claim 1, wherein the rolling of the electrode under the appropriate temperature condition includes heating the electrode before being rolled, under the appropriate temperature condition.

10. A method for manufacturing an electrode including the method for rolling the electrode according to claim 1, preceded by preparing the electrode active material and preparing the electrode slurry by mixing the electrode active material with at least a conductive material and a binder.

11. A method for manufacturing a secondary battery including:
- preparing a positive and a negative electrode using the method for manufacturing the electrode according to claim 10; and
- alternately stacking the positive electrode, a separator, and the negative electrode.

* * * * *